United States Patent
Schrempp et al.

(10) Patent No.: US 10,476,925 B2
(45) Date of Patent: *Nov. 12, 2019

(54) MEDIA STREAM CUE POINT CREATION WITH AUTOMATED CONTENT RECOGNITION

(71) Applicant: Audible Magic Corporation, Los Gatos, CA (US)

(72) Inventors: Jim Schrempp, Saratoga, CA (US); Rob Williams, San Jose, CA (US); Vance Ikezoye, Los Gatos, CA (US); Dave Avery, San Jose, CA (US); Erling Wold, San Francisco, CA (US); Alan Edel, San Jose, CA (US)

(73) Assignee: Audible Magic Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,813

(22) Filed: Oct. 1, 2018

(65) Prior Publication Data

US 2019/0036998 A1   Jan. 31, 2019

Related U.S. Application Data

(63) Continuation of application No. 14/502,791, filed on Sep. 30, 2014, now Pat. No. 10,091,263.
(Continued)

(51) Int. Cl.
*H04L 29/06* (2006.01)
*G06K 9/00* (2006.01)
(Continued)

(52) U.S. Cl.
CPC ........ *H04L 65/601* (2013.01); *G06K 9/00744* (2013.01); *G06K 9/6215* (2013.01);
(Continued)

(58) Field of Classification Search
CPC ............... H04L 65/601; H04L 65/4069; H04L 65/4084; H04L 65/602; H04L 65/604;
(Continued)

(56) References Cited

U.S. PATENT DOCUMENTS 5,918,223 A   6/1999   Blum et al.
6,698,020 B1   2/2004   Zigmond et al.
(Continued)

FOREIGN PATENT DOCUMENTS

WO   2014/004955 A1   1/2014

OTHER PUBLICATIONS

International Search Report and Written Opinion for PCT/US2015/031167 dated Aug. 14, 2015.
(Continued)

*Primary Examiner* — Jerry B Dennison
(74) *Attorney, Agent, or Firm* — Lowenstein Sandler LLP

(57) ABSTRACT

A media stream cue point creator receives a media stream comprising at least one of an audio portion or a video portion, wherein the media stream lacks at least one indicator of a content segment within the media stream. The media stream cue point creator identifies a first segment of the plurality of segments of the media stream, wherein the segment corresponds to a segment in a segment reference data store, and creates a cue point associated with the first segment, wherein the cue point identifies at least one of a beginning or an end of the first content segment in the media stream.

20 Claims, 11 Drawing Sheets

Related U.S. Application Data

(60) Provisional application No. 62/001,240, filed on May 21, 2014.

(51) Int. Cl.
*H04N 21/234* (2011.01)
*H04N 21/4402* (2011.01)
*G06K 9/62* (2006.01)

(52) U.S. Cl.
CPC ...... *H04L 65/4069* (2013.01); *H04L 65/4084* (2013.01); *H04L 65/602* (2013.01); *H04L 65/604* (2013.01); *H04L 65/605* (2013.01); *H04N 21/23424* (2013.01); *H04N 21/440245* (2013.01)

(58) Field of Classification Search
CPC ............ H04L 65/605; G06K 9/00744; G06K 9/6215; H04N 21/23424; H04N 21/440245
See application file for complete search history.

(56) References Cited

U.S. PATENT DOCUMENTS

| | | | |
|---|---|---|---|
| 6,834,308 | B1 | 12/2004 | Ikezoye et al. |
| 7,877,438 | B2 | 1/2011 | Schrempp et al. |
| 8,031,947 | B2* | 10/2011 | Jacobsen ............ G06F 16/7854 382/199 |
| 8,112,818 | B2 | 2/2012 | Wold |
| 8,332,403 | B2 | 12/2012 | Yoshimura et al. |
| 10,091,263 | B2* | 10/2018 | Schrempp ........... H04L 65/4069 |
| 2002/0097979 | A1 | 7/2002 | Lowthert et al. |
| 2004/0189873 | A1* | 9/2004 | Konig ............... G06K 9/00744 348/607 |
| 2004/0194130 | A1* | 9/2004 | Konig ................... G06Q 30/02 725/32 |
| 2005/0125821 | A1 | 6/2005 | Li et al. |
| 2006/0187358 | A1* | 8/2006 | Lienhart ........... G06K 9/00711 348/661 |
| 2006/0195860 | A1 | 8/2006 | Eldering et al. |
| 2007/0101359 | A1* | 5/2007 | Schiller ............... H04H 20/103 725/33 |
| 2008/0120646 | A1 | 5/2008 | Stern et al. |
| 2008/0189753 | A1 | 8/2008 | Nesvadba et al. |
| 2009/0052870 | A1 | 2/2009 | Marsh et al. |
| 2009/0100460 | A1 | 4/2009 | Hicks, III et al. |
| 2009/0300145 | A1 | 12/2009 | Musayev et al. |
| 2010/0037253 | A1* | 2/2010 | Sheehan ............. H04H 20/103 725/31 |
| 2011/0191178 | A1 | 8/2011 | Newberg et al. |
| 2011/0271299 | A1 | 11/2011 | Kakani et al. |
| 2012/0096486 | A1* | 4/2012 | Stallard ............... H04H 20/106 725/32 |
| 2012/0227065 | A1 | 9/2012 | Gilley et al. |
| 2014/0134941 | A1 | 5/2014 | Anniballi et al. |
| 2014/0297419 | A1* | 10/2014 | Ramachandra .... G06Q 30/0267 705/14.64 |
| 2014/0304233 | A1 | 10/2014 | Belaunde |
| 2015/0067723 | A1 | 3/2015 | Bloch et al. |
| 2015/0163545 | A1 | 6/2015 | Freed et al. |
| 2015/0201227 | A1* | 7/2015 | Krasko ............. H04N 21/2668 725/34 |
| 2015/0245079 | A1 | 8/2015 | Tremblay |
| 2015/0341410 | A1 | 11/2015 | Schrempp et al. |
| 2016/0050465 | A1 | 2/2016 | Zaheer et al. |

OTHER PUBLICATIONS

Supplementary European Search Report for European Application No. EP 15795649, dated Nov. 17, 2017, 8 pages.

* cited by examiner

| Segment Information Data Store 124 | | | | |
|---|---|---|---|---|
| Stream ID | Segment ID | Start Cue Pt. | End Cue Pt. | Metadata |
| 300 | 01 | 304 | 306 | ... |
| 300 | 02 | 308 | 310 | ... |
| 300 | 03 | 312 | 314 | ... |
| 300 | 04 | 314 | 316 | ... |

MEDIA STREAM CUE POINT CREATION WITH AUTOMATED CONTENT RECOGNITION

RELATED APPLICATIONS

This application is a continuation of U.S. patent application Ser. No. 14/502,791, filed on Sep. 30, 2014, which claims the benefit of U.S. Provisional Application No. 62/001,240, filed on May 21, 2014, the entire contents of each of which are hereby incorporated by reference herein.

TECHNICAL FIELD

This disclosure relates to the field of media content identification, and in particular to media stream cue point creation with automated content recognition.

BACKGROUND

A large and growing population of users enjoys entertainment through the consumption of media items, including electronic media, such as digital audio and video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like. Media content suppliers provide media items to consumers through a variety of means. Some media content suppliers deliver media items in single units, others in bulk, others through some linear streaming experience, and others by providing playlists or manifest files of media segments or chunks. Some media content suppliers employ a variety of delivery means. Much electronic media content is offered to users free of charge and subsidized through advertising. This advertising can include advertising messages conveyed using audio, text, logos, animations, videos, photographs or other graphics. Some examples of advertisements include banner ads, frame ads, pop-up ads, floating ads, expanding ads, interstitial ads, video ads, audio ads and text ads. These advertisements can be presented to a user in a variety of ways including on a web-page, through social media applications, on a mobile device, or in an audio or video advertisement slot between or within segments of regular programming or even on top of regular programming.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
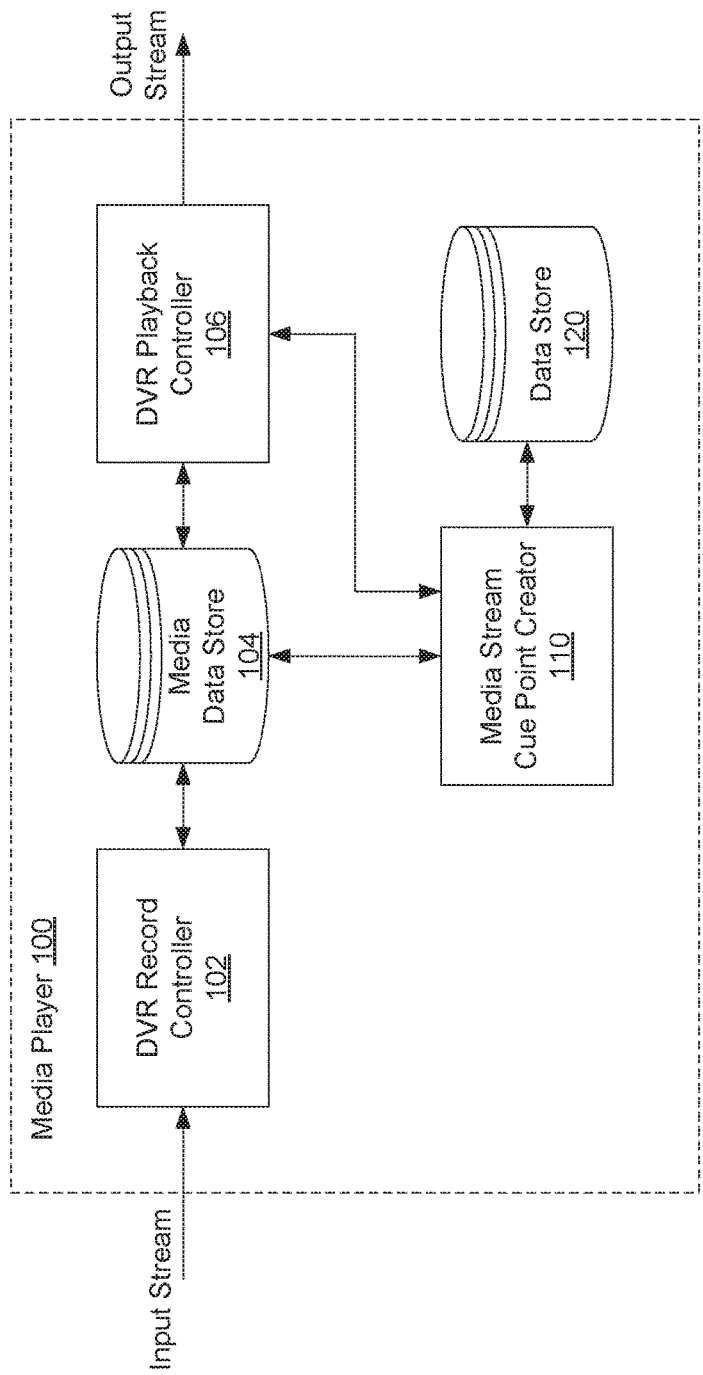
FIG. 1a is a block diagram illustrating a media player with a local media stream cue point creator, according to an embodiment.

Embodiments are described for media stream cue point creation with automated content recognition. In one embodiment, a media stream, including audio and/or video streams, has multiple different segments. These segments may include for example, content segments and advertisements. In this disclosure the term "content segment" is understood to mean any content in the media stream, whether advertisement, program, public service announcement, static video image, or even a blank video or audio segment. "Content segment" may also mean a sub-segment of an advertisement, program, public service announcement, etc. In one embodiment, a party, such as a media content provider or media player manufacturer, may wish to replace one or more content segments of the media stream with different content segments. Sometimes programming content or advertisements are only permitted to be delivered in certain geographic areas. A media delivery service may wish to replace or remove certain content segments before delivery to certain geographic areas or receivers. In some cases an advertisement may have a sub-segment somewhere within it that delivers a very specific message. A media delivery service may wish to replace that sub-segment of the advertisement with another content segment which is more appropriate for the receiver. In one embodiment, a media content provider or media delivery service may include, for example, an Internet service provider, cable company, production company, web site provider, social media web site, music or video web site, telecommunications company, over-the-top content provider, cloud DVR company, or other provider. For example, a media content provider may wish to replace the advertisements in a media stream it receives with different advertisements before it provides the media stream to its users, (e.g., customers or subscribers). For example, a media content provider may wish to replace a content segment with another content segment before it provides the media stream to its customers or subscribers. In another embodiment, a party may wish to overlay some content on top of some content segment of the rendered media stream. Such overlays may be a banner ad or additional information of interest to a user. A party may wish to display sports scores over media content, but remove the overlay whenever an advertisement is playing. Alternatively, a party may wish to display additional information about an advertisement, but remove the overlay as soon as the advertisement ends. A party may wish to replace a content segment with a static video image segment. A party may wish to remove a content segment from a stream. In one embodiment, a party may wish to take actions to facilitate the augmentation of the media stream to support users with one or more disabilities. For example, the party may provide different levels of closed captioning information while content is playing. The different levels may include basic information that may be useful to a hearing person or additional information that may be useful to a deaf person. The additional information may be synchronized with the media stream, and the media stream may not have appropriate or accurate cue points.

In another embodiment, a media content provider or device may send a signal to a second device, such as a tablet or Set Top Box, which then takes some action, such as to display complementary content or advertising, present the user with a survey, or allow the user to comment on the stream. In another embodiment a party may wish to know which content segment a user is experiencing. Knowing which content segments a user is or has experienced over time, can allow a party to better select future advertising or media content for this user. Unless the media stream has cue points, such as SCTE 35 codes, embedded in the stream to designate the locations of the content segments, the media content provider may have no way of telling where or when the content segments are located in the stream. As a result, it may not be able to take action where a specific content segment is located in the media stream. In some cases, even when cue points or other indicators are present in the media stream, these may not be accurate or reliable, which can result in errors during segment replacement. In addition, embedded cue points, such as SCTE 35, are most often provided to indicate the boundary points between media segments. The media content provider may wish to trigger actions that occur inside a media segment. For instance, a media content provider may wish to trigger an action whenever a certain song is present in the audio media stream, when a certain language is detected, when a certain sound (e.g., a phone ringing, a car door closing) is detected, or when a class of sounds (e.g., dogs barking, explosions, footsteps) is detected. Or a media content provider may wish to trigger an action whenever a certain object, such as a can of soda, or a particular person is present in the video media stream. The media content provider may wish to only replace certain content segments. In many cases, embedded cue points do not supply metadata or links describing the particular content segments that would be needed to replace only certain content segments. In another embodiment a party may wish to replace a sub-segment of media content with another segment that is more appropriate for the viewer. For example, a party may wish to replace the last part of an advertisement that offers a specific discount with a different segment offering a different discount. In another example, a party may wish to completely remove some part of an advertisement that offers a specific discount or mentions a specific retailer. In another example, a party may wish to provide information about the location and contact information of a local retailer during a nationally broadcast advertisement.

In one embodiment, a media stream cue point creator, located within a media player, at a media distribution point (such as a cable operator headend, or a node of a content delivery network, or a radio or TV station rebroadcasting a syndicated program), or on a network-connected server, uses automated content recognition to identify particular content segments in a media stream that has no prior cue points or indicators, and generates cue points associated with the identified content segments. The media stream cue point creator, or other parties, may then locate a given segment in the media stream using the generated cue points and perform some operation with respect to the segment. For example, the media stream cue point creator may identify an advertisement in a media stream and allow a content provider to replace the advertisement with a different advertisement, block the advertisement, overlay content on the advertisement, replace the advertisement with other media content, or remove the advertisement.

In one embodiment, the media stream cue point creator receives an incoming media stream and generates an audio and/or video fingerprint of the media stream. The media stream cue point creator compares the fingerprint to a database of known media segments to determine if there is a match using certain techniques. One such technique is described in U.S. Pat. No. 5,918,223, issued Jun. 29, 1999, the entire contents of which are hereby incorporated by reference herein. If the fingerprint matches the fingerprint of a known media segment in the database, or at least a portion of the known fingerprint, the media stream cue point creator generates a cue point entry in a segment information data store. One of skill in the art would recognize that many techniques are known for detecting specific objects within the images of a video media stream. Using one of these techniques, when an object is identified to be present in the media stream, the cue point creator generates a cue point entry in a segment information data store. The cue point entry may include information, such as, an identifier of the media stream, an identifier of the segment, a start time/value of the segment, advertising related information, a stop time/value of the segment, and other metadata describing the segment. Either prior to or during playback of the media stream, the media stream cue point creator identifies a cue point in the media stream and triggers some operation, such as a segment replacement. During segment replacement, the media stream cue point creator may identify playback context information, such as when, where, by who, etc. playback is being performed, and either provide that information to another party, or use that information itself, to select a replacement segment (e.g., new advertisement). The media stream cue point creator, or some other device, may then replace the original segment in the media stream with the new segment and continue stream playback.

In one embodiment, the media stream cue point creation operations using automated content recognition, which are described herein, allow a party to recognize and identify particular segments in a media stream which previously had no cue points or other indicators of the various segments. In other embodiments, the techniques described herein may be used on a media stream that has some cue points, but is missing others, or has cue points present that are unreliable or inaccurate. This allows the parties to perform a variety of operations on the segments, identified now by the created cue points, such as segment replacement or overlay. The ability to identify and replace and report on viewer consumption of segments in a media stream can lead to many advantages, such as improved content, increased advertising revenue, and others.

FIG. 1a is a block diagram illustrating a media player 100 with a local media stream cue point creator 110, according to an embodiment. In one embodiment, media player 100 may be any type of computing device including a server computer, gateway computer, desktop computer, laptop computer, mobile communications device, cell phone, smart phone, hand-held computer, tablet computer, set top box (STB), digital video recorder (DVR), wearable computer, or similar computing device. Media player 100 may be variously configured with different features to enable the recording and viewing of content and resources, and the execution of one or more applications. Media player 100 may be embodied, for example, by computer system 700 of FIG. 7.

In one embodiment, media player 100 includes various modules and data stores to enable the recording and playback of media content. For example, media player 100 may include DVR record controller 102, media data store 104 and DVR playback controller 106. In one embodiment, DVR record controller 102 receives an incoming media stream and may optionally, at the instruction of a user or program running in media player 100, record a copy of the media stream in media data store 104. A copy of the media stream may be stored temporarily (while media stream cue point creator 110 performs associated processing) before playback, or may be stored for a longer period of time for playback at a later time or date. Media data store 104 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. The recorded media stream may be stored in the MPEG format or in any other suitable format. DVR playback controller 106 manages playback of recorded media from media data store 104 on an internal or externally connected display device, such as a directly connected display or a display at a remote terminal connected over a network (e.g., a cloud DVR). DVR playback controller 106 may start, stop, pause, or continue playback of recorded media at the instruction of a user or other program running in media player 100.

In one embodiment, media player 100 further includes media stream cue point creator 110 and associated data store 120. Data store 120 may be a standalone data store or may share a storage device with media data store 104. Media stream cue point creator 110 uses automated content recognition to identify particular segments in a media stream stored in media data store 104, and generate cue points associated with the identified segments. The media stream cue point creator 110, or another module, may then locate a given segment in the media stream using the generated cue points and perform some operation on the segment. For example, the media stream cue point creator 110 may identify an original advertisement in a stored media stream and replace the original advertisement with a new advertisement. This replacement may be done as the media stream is being viewed. In the case of recorded media streams this replacement may also be done before the media stream is viewed. In another embodiment, an input media stream is received and the data is sent to media stream cue point creator 110 and to an output device, such as screen or speaker, at the same time. Media stream cue point creator 110 may take a short period of time to perform its processing (i.e., identifying a content segment and creating a cue point). In the meantime, the content segment may have already started playing on the output device. Media stream cue point creator 110 may trigger an overlay to be put up during the content segment. Media stream cue point creator 110 may predict when the content segment will end and trigger the removal of the overlay, right as the content segment ends. In this case, media data store 104 may not be involved. In another embodiment, media data store 104 may keep a small buffer of the media stream to delay the playback, perhaps to give the user a "skip ahead" or "skip back" function. Additional details of media stream cue point creator 110 are provided below.

Figure 1B:
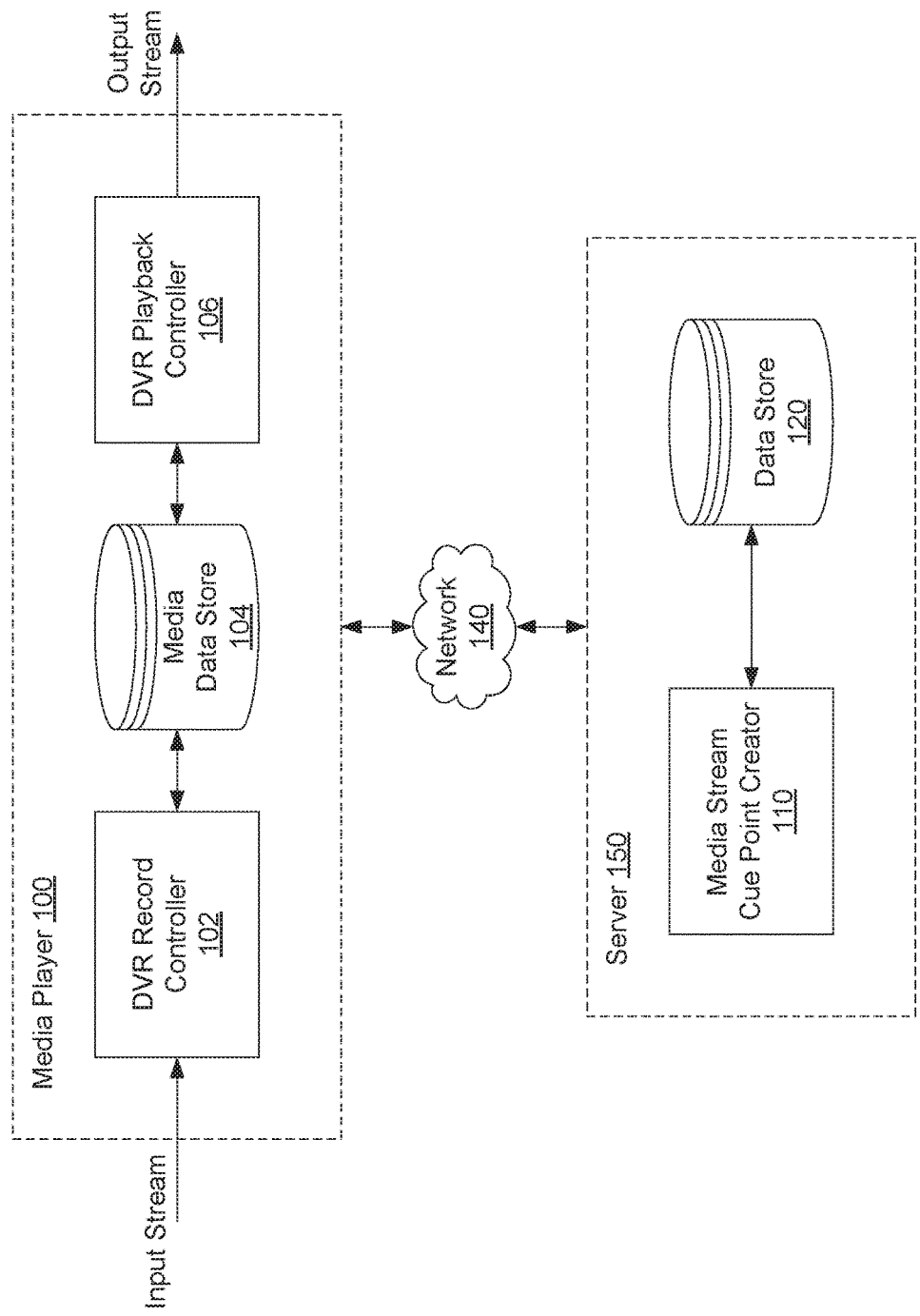
FIG. 1b is a block diagram illustrating a media player with a remotely connected media stream cue point creator, according to an embodiment.

FIG. 1b is a block diagram illustrating a media player 100 with a remotely connected media stream cue point creator 110, according to an embodiment. In one embodiment, media player 100 may not have an internal media stream cue point creator, but rather may be connected to a remote server 150 over a network 140. Network 140 can be a local area network (LAN), a wireless network, a telephone network, a mobile communications network, a wide area network (WAN), such as the Internet, near field communication link, Bluetooth, or similar communication system. Server 150 may include a network-accessible server-based functionality, various data stores, and/or other data processing equipment. Server 150 may be implemented by a single machine or a cluster of machines. Server 150 may be hosted, for example, by computer system 700 of FIG. 7.

In one embodiment, server 150 hosts media stream cue point creator 110 and associated data store 120. When running on remote server 150, media stream cue point creator 110 and associated data store 120 may perform substantially the same as when they are hosted locally within media player 100. In this embodiment, communication between media stream cue point inserter 110 and the other components of media player 100 (e.g., DVR record controller 102, media data store 104, DVR playback controller 106) may occur across network 140. One of skill in the art would understand that the description of media stream cue point creator 110 herein should apply equally whether media stream cue point creator 110 is located locally within media player 100, remotely at server 150 or any other location. In other embodiments, the functionality of media stream cue point creator 110 may be divided across multiple devices. For example, a portion within media player 100 may create fingerprints of the media stream and send them to another portion located on server 150, where additional analysis is performed.

Figure 1C:
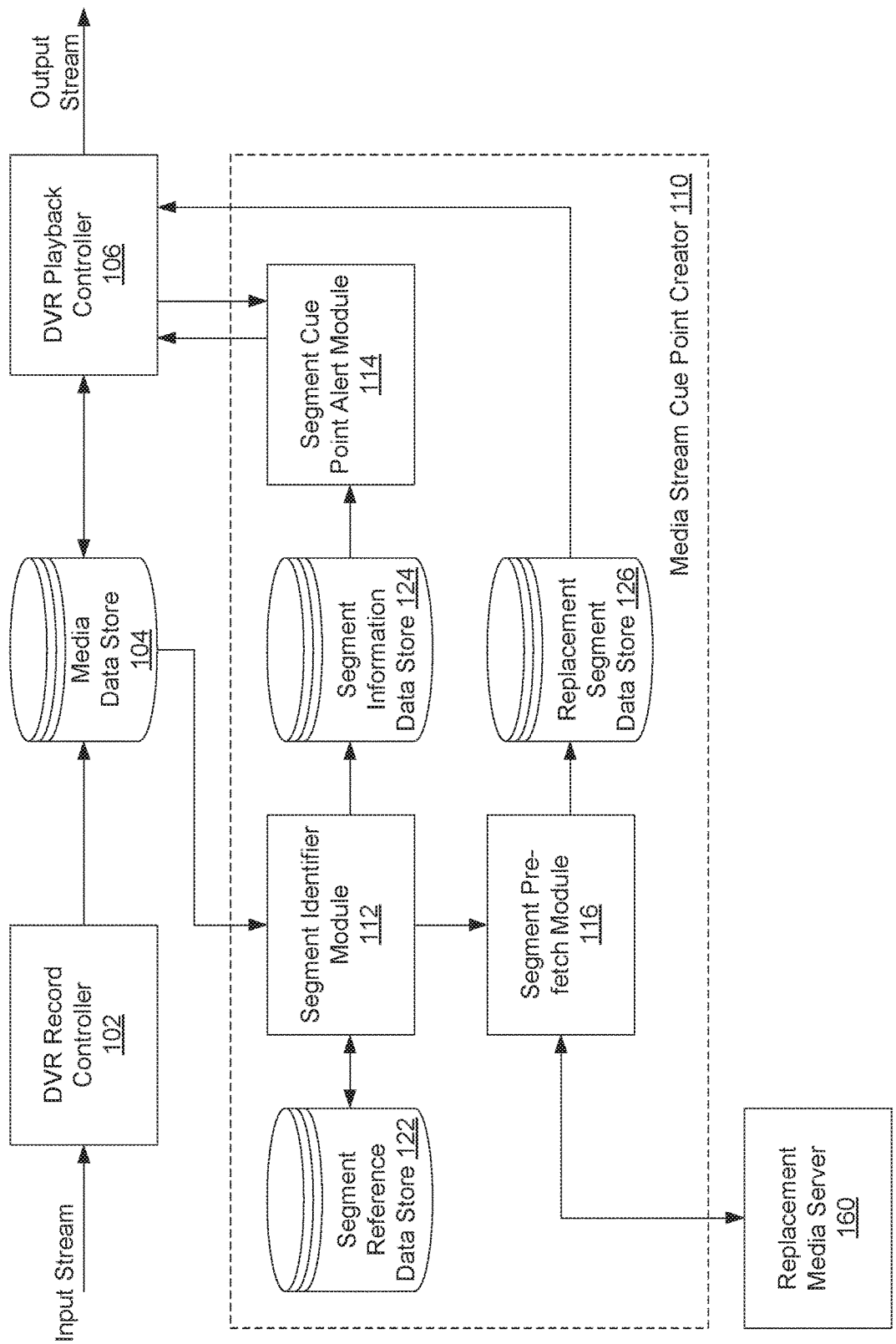
FIG. 1c is a block diagram illustrating a detailed view of a media stream cue point creator for use in a media player, according to an embodiment.

FIG. 1c is a block diagram illustrating a detailed view of a media stream cue point creator 110 for use in a media player 100, according to an embodiment. In one embodiment, media stream cue point creator 110 includes segment identifier module 112, segment cue point alert module 114 and segment pre-fetch module 116. This arrangement of modules and components may be a logical separation, and in other embodiments, these modules or other components can be combined together or separated in further components, according to a particular embodiment. In one embodiment, a data store connected to media stream cue point creator 110 includes segment reference data store 122, segment information data store 124, and replacement segment data store 126. In one embodiment, media player 100 may include both media stream cue point creator 110 and data store 120. In another embodiment, the data store 120 may be external to media stream cue point creator 110 and may be connected over a network or other connection. In other embodiments, media player 100 may include different and/or additional components that are not shown to simplify the description.

In one embodiment, segment identifier module 112 identifies segments of a media stream stored in media data store 104 using automated content recognition. In one embodiment, there may by a minor delay when automated content recognition is performed on a live data stream. This delay, however, may be inconsequential to the end viewer and may run concurrently with normal broadcast delays. Segment identifier module 112 generates an audio and/or video fingerprint of at least a portion of the media stream. For example, segment identifier module 112 may divide a stored or buffered audio stream into overlapping frames (e.g., approximately 0.1 seconds in length with an overlap of approximately 0.025 seconds) and extract acoustic or perceptual features of each frame. Perceptual features may include characteristics of sounds in terms of commonly understood physical characteristics, such as brightness, pitch and loudness. Other characteristics may include bass, bandwidth, and Mel-frequency Cepstral Coefficients (MFCCs) at periodic intervals over the length of the frame. Segment identifier module 112 may generate an n-dimensional feature vector for each frame and compare the feature vector to stored feature vectors corresponding to known segments from segment reference data store 122. Segment reference data store 122 may store feature vectors, fingerprints, complete copies, or other representations of known segments of media content. Data store 122 may store metadata used to identify the content represented by the feature vector. For example, segment reference data store 122 may include representations of known advertisements which could be identified and potentially removed from the media streams in media data store 104. In one embodiment, segment identifier module 112 may extract perceptual features of the video image stream. These perceptual features may include commonly understood characteristics such as brightness, color, luminosity, etc. Other characteristics may include lines, shapes, depth features, occlusion, and other features used in object detection. Segment reference data store 122 may contain video fingerprints of know content segments, as well as models and classes of objects. In one embodiment, segment identifier module 112 may compare characteristics of the video image stream to these fingerprints in order to identify media segments within the video image stream. In another embodiment, segment identifier module 112 may use object models and classes to identify objects within the video image stream or the audio stream. When a given object is identified, this may signify a portion of interest in the media stream. For example, a certain object may appear at the beginning of a content segment, and detection of that object may be used to identify the segment and trigger segment replacement or some other action. Segment reference data store 122 may be populated with information obtained directly from advertisers, other content creators, or a content distributor, or with information obtained from monitoring previous media streams. Segment reference data store 122 may be populated with models or classes describing specific objects or sounds (e.g. a certain person, a certain model of automobile, a certain building, or a certain corporate logo) or generic objects or sounds (e.g. a soda can, an automobile, a building). These classes and models may be created specifically for this application or obtained from a library of object classes and models. In one embodiment, segment identifier module 112 or some other module may monitor live media streams and locate repeating segments of media using acoustic, visual or other perceptual features or other data, such as closed captioning text, etc. Segment identifier module 112 may flag repeating segments of a specified length (e.g., 10 seconds, 30 seconds, 45 seconds, 60 seconds) for further investigation. In one embodiment, a human curator may verify that the flagged segments are advertisements or other interesting pieces of content and may add them to segment reference data store 122. Additional details about identifying known segments for segment reference data store 122 may be found in U.S. Pat. No. 7,877,438 issued Jan. 25, 2011, the entire contents of which are hereby incorporated by reference herein.

In one embodiment, upon identifying a segment that matches a known segment or object in segment reference data store 122, segment identifier module 112 creates a cue point associated with the identified segment. In one embodiment, segment identifier module 112 creates a corresponding entry in segment information data store 124. In one embodiment, the cue point entry may include an identifier of the media stream from which the segment was identified, an identifier of the segment itself, a start time/value of the segment within the media stream, a stop time/value of the segment, and other information or metadata associated with the segment, such as an indication of what product the advertisement is for, the subject matter of the advertisement, a recommended audience for the advertisement, the name of a person, the location of a building, a description of the object, etc. One example of segment information data store 124 is described below with respect to FIG. 3b. In another embodiment, segment identifier module 112 may insert an indication of the cue point directly into the media stream itself. For example, segment identifier module 112 could send instructions to segment cue point alert module 114, or some other module, which could embed SCTE 35 codes in the media stream or media file.

In one embodiment, segment cue point alert module 114 generates an alert signaling replacement of a segment in the media stream identified by the cue point entry in segment information data store 124. Segment cue point alert module 114 identifies a cue point for the media stream. This may occur during playback of the media stream by DVR playback controller 106 or prior to playback when the stream is stored as a file in media data store 104. In one embodiment, segment cue point alert module 114 receives an indication of playback from DVR playback controller 106 and compares the location to the cue points in segment information data store 124. When a cue point is reached, segment cue point alert module 114 may trigger an operation, such as segment replacement. In other embodiments, segment cue point alert module 114 may trigger an operation several seconds (or some other period of time) prior to the cue point being reached. In other embodiments, other operations that may be triggered include the overlay of complementary advertisement data, the overlay of complementary program data (such as sports scores), the removal of an overlay that was put in place earlier, such as a persistent ad overlay that taken down as soon as recognized programming begins or a program overlay that is taken down as soon as an ad segment begins, the removal of a segment, or the insertion of a new segment. In other embodiments, the segment cue point alert module 114 may send a trigger to another device such as a tablet or smartphone which then takes action. In other embodiments, segment cue point module 114 may send an alert to a data store which monitors viewing habits.

In one embodiment, segment cue point alert module 114 identifies playback context information for the media stream. The playback context information may include, for example, a time when playback occurs, a location where playback occurs, an indication of who requested playback, or other information. Using the playback context information, segment cue point module 114 may request a new segment from replacement segment data store 126. In one embodiment, segment pre-fetch module 116 may request and receive content segments (e.g., advertisements, online videos, overlays, information) from an external source, such as media replacement server 160. Examples of replacement media server 160 may include an ad server, an online content provider, a social network, etc. Segment pre-fetch module 116 may populate replacement segment data store 126 with the received replacement segments. In one embodiment, segment pre-fetch module 116 may request segments based on the playback context information and media replacement server 160 may determine the appropriate segments to provide. In another embodiment, segment pre-fetch module 116 may request generic segments from media replacement server 160 and segment cue point alert module 114 may make a selection of segments from replacement segment data store 126 based on the playback context information. In another embodiment, segment cue point alert module 114 may instruct DVR playback controller 106 to insert a media stream that is being streamed in real time from replacement media server 160. In one embodiment, segment cue point alert module 114 provides an instruction to DVR playback controller 106 to replace the original segment in the playing media stream with the replacement segment from replacement segment data store 126. In another embodiment, rather than replacing a segment, segment cue point alert module 114 may provide an instruction to DVR playback controller 106 to block a certain segment, remove a certain segment, or to perform some other operation. In another embodiment, DVR playback controller 106 may modify a media file in media data store 104.

Figure 2A:
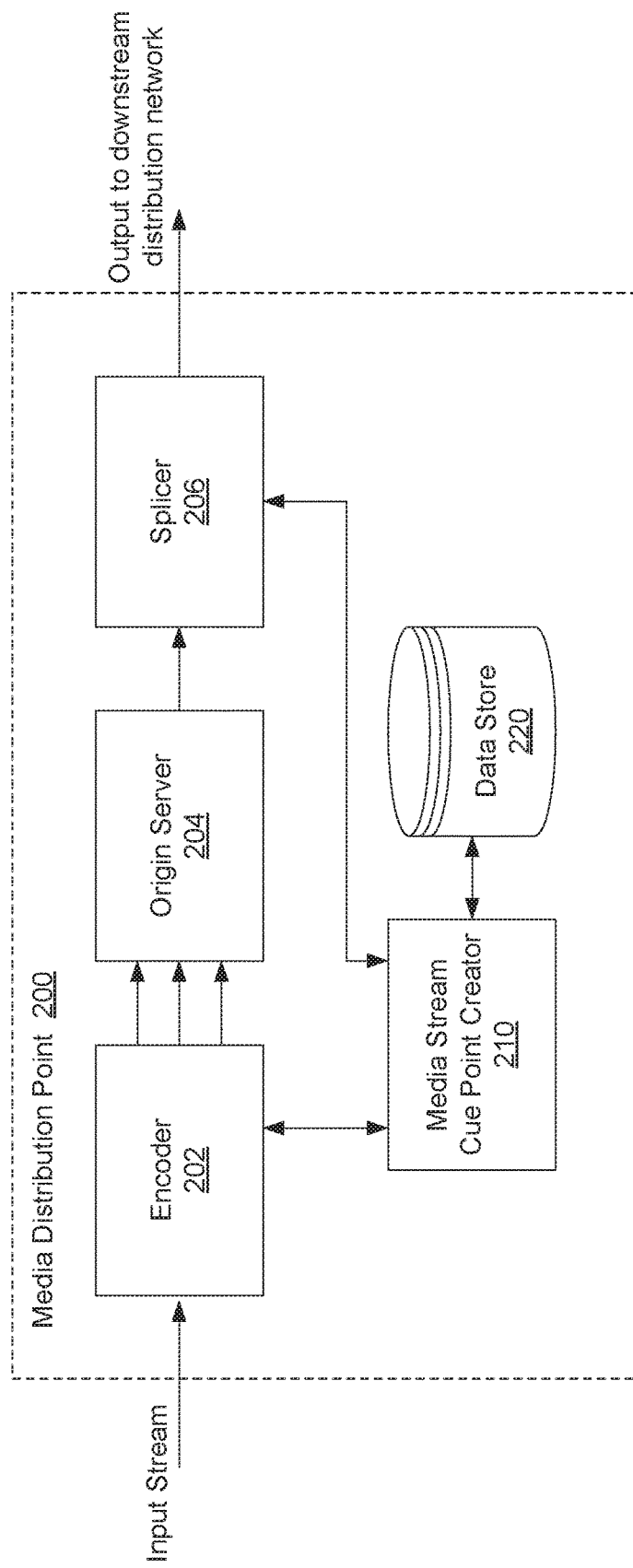
FIG. 2a is a block diagram illustrating a media distribution point with a local media stream cue point creator, according to an embodiment.

FIG. 2a is a block diagram illustrating a media distribution point 200 with a local media stream cue point creator 210, according to an embodiment. Media distribution point 200 may be embodied, for example, by computer system 700 of FIG. 7. In one embodiment, media distribution point 200 may be a retransmission facility or a cable television headend, and may include a master facility for receiving television or other signals for processing and distribution over a cable television system or other communication system. The media distribution point may include electronic equipment used to receive and re-transmit, audio, video or other signals over the local communication infrastructure.

In one embodiment, media distribution point 200 includes various modules and data stores to enable the broadcast or other distribution of media content. For example, media distribution point 200 may include encoder 202, origin server 204 and splicer 206. In one embodiment, encoder 202 receives an incoming media stream and encodes the media stream into various distribution formats. The incoming media stream, or input stream, may be received, for example, over a satellite downlink, high speed network link, or other communications system. The formats may include for example, standard definition, high definition, web format, or other formats, aspect ratios and/or pixel resolutions. Encoder 202 provides the various encoded media streams to origin server 204. In one embodiment, origin server 204 serves as the source of the media stream to the rest of the downstream network. For example, the origin server might host several different encodings of the same stream. The media stream might not be stored for long on the origin server 204, which may be serving as a buffer between the encoder 202 and the distribution network. In other embodiments, origin server 204 might store the streams for a longer period of time (e.g., a week or month). In other embodiments, origin server 204 might store content forever, as in the case of a Video On Demand origin server. Splicer 206 is responsible for performing segment replacement of certain segments in the various media streams. For example, splicer 206 may be configured to remove a certain segment and insert a new segment, stop playback of a first stream, play a segment from a different stream, and resume playback of the first stream, or other operations.

In one embodiment, media distribution point 200 further includes media stream cue point creator 210 and associated data store 220. Data store 220 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Media stream cue point creator 210 may be the same as or similar to media stream cue point creator 110 described above, such that it uses automated content recognition to identify particular segments and objects in a media stream that has no prior cue points or indicators, or inaccurate or unreliable cue points, and generates cue points associated with the identified segments. The media stream cue point creator 210, or another module, may locate a given segment in the media stream using the generated cue points and either perform, or alert some other module to perform, an operation on the segment. For example, the media stream cue point creator 210 may identify an original advertisement in a media stream and signal splicer 206 to replace the original advertisement with a new advertisement. For example, the media stream cue point creator 210 may identify a content segment and alert encoder 202 to place the appropriate cue markers, such as SCTE 35, into the encoded streams. Additional details of media stream cue point creator 210 are provided below.

Figure 2B:
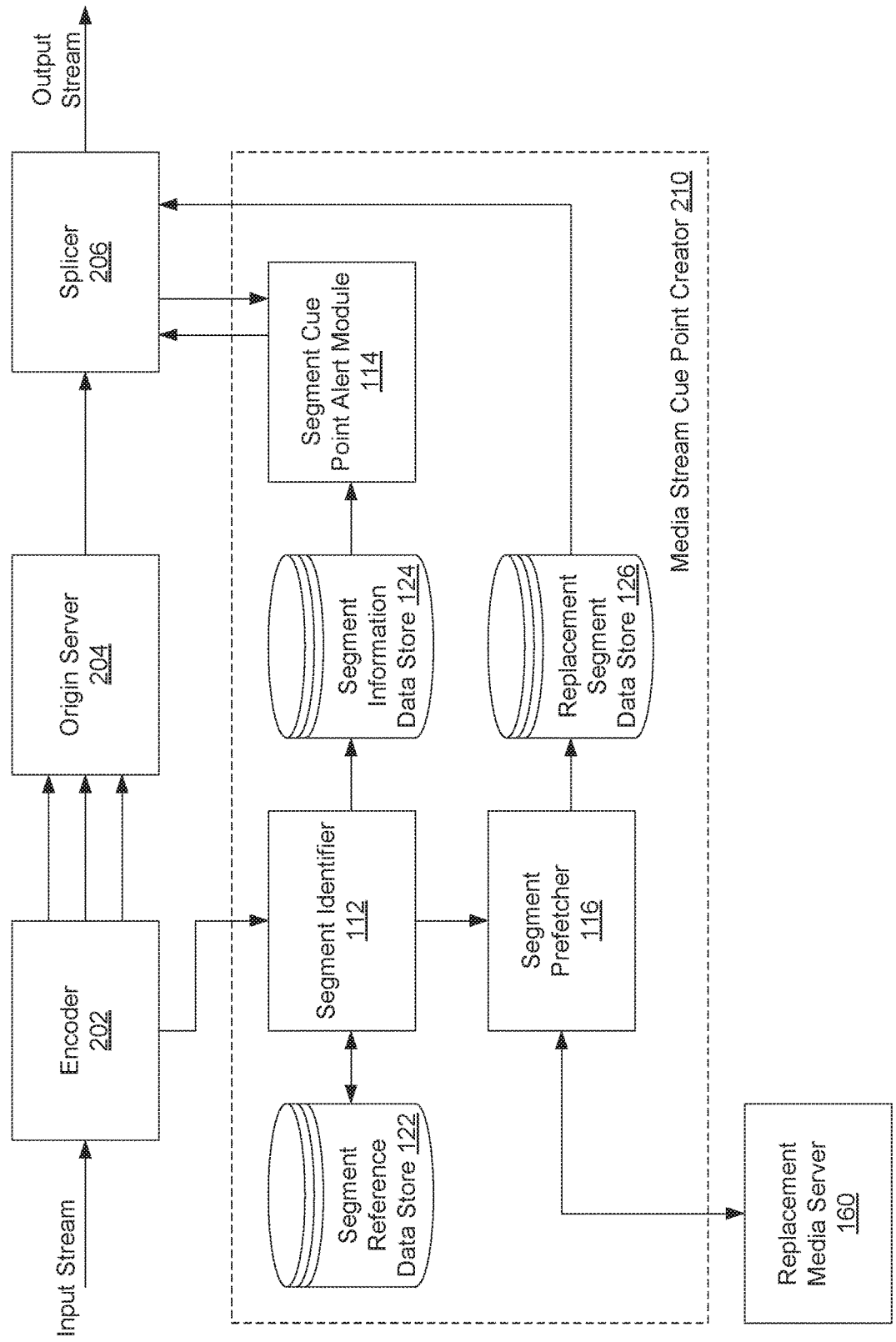
FIG. 2b is a block diagram illustrating a detailed view of a media stream cue point creator for use in a media distribution point, according to an embodiment.

FIG. 2b is a block diagram illustrating a detailed view of a media stream cue point creator 210 for use in a media distribution point 200, according to an embodiment. In one embodiment, media stream cue point creator 210 is the same as or similar to media stream cue point creator 110 described above, and includes segment identifier module 112, segment cue point alert module 114 and segment pre-fetch module 116. In one embodiment, data store 220 is connected to media stream cue point creator 210 and includes segment reference data store 122, segment information data store 124, and replacement segment data store 126. In one embodiment, media distribution point 200 may include both media stream cue point creator 210 and data store 220. In another embodiment, the data store 220 may be external to media stream cue point creator 210 and may be connected over a network or other connection. In other embodiments, media distribution point 200 may include different and/or additional components which are not shown to simplify the description. One of skill in the art would understand that the description of media stream cue point creator 110 herein should apply equally to media stream cue point creator 210, as their operation is substantially the same. Accordingly, a description of the operation of media stream cue point creator 210 is not repeated here so as not to obscure the present disclosure.

Figure 2C:
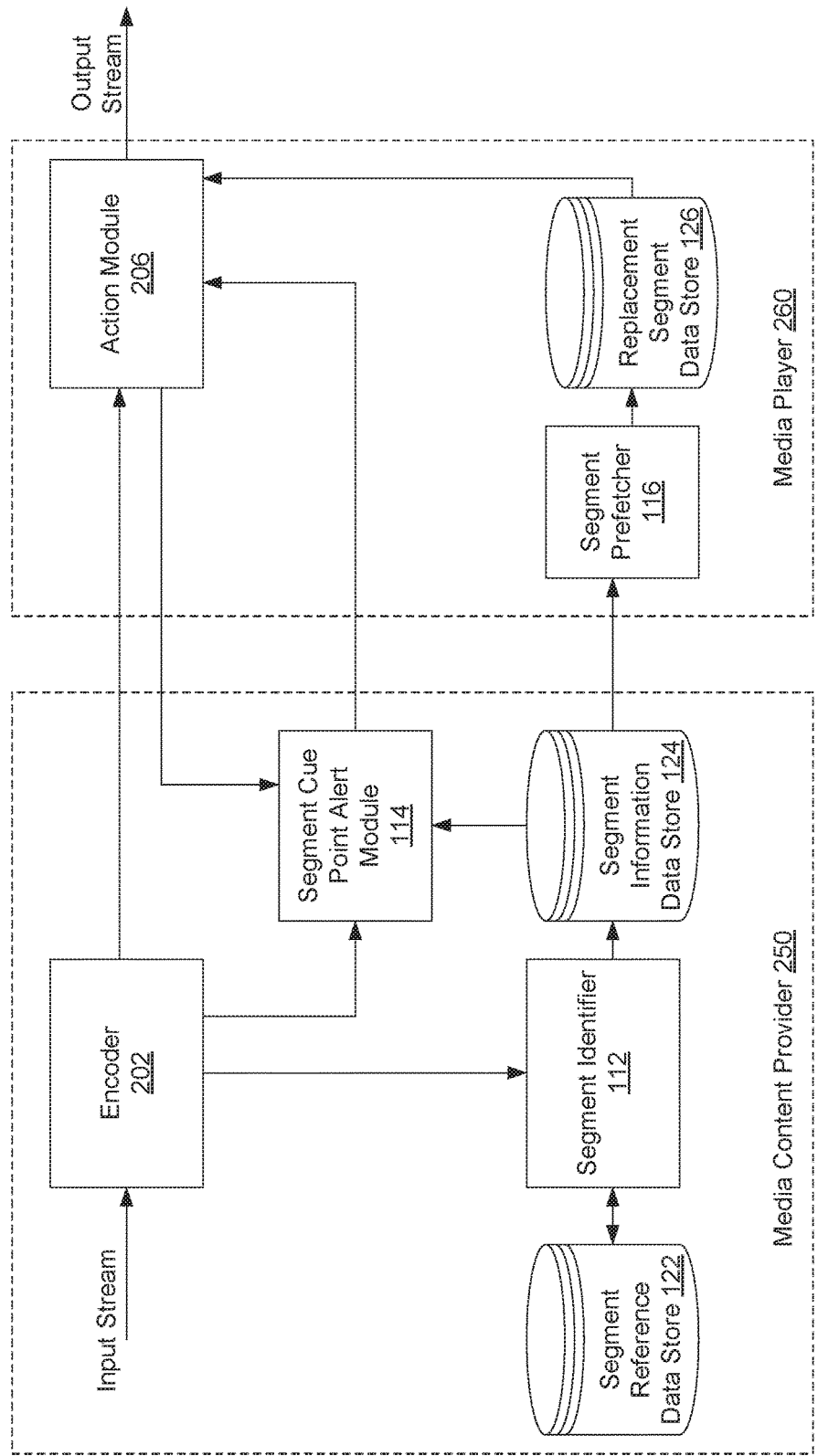
FIG. 2c is a block diagram illustrating a media stream cue point creator that is distributed across multiple locations, according to an embodiment.

FIG. 2c is a block diagram illustrating a media stream cue point creator that is distributed across multiple locations, according to an embodiment. In one embodiment, a network environment includes two separate entities, such as media content provider 250 and media player 260. Media content provider 250 may include, for example, a cable, satellite or broadcast television provider, an Internet service provider, an on-line media provider, or some other content provider. Media player 260 may be part of a user device configured to receive and playback media content received from media content provider, including for example, a set top box, an over-the-top box, etc. In one embodiment, media content provider 250 and media player 260 are located in different physical locations but are connected via a network, such as the Internet. In one embodiment, different components of the media stream cue point creator described above are distributed across media content provider 250 and media player 260. For example, segment identifier 112, segment reference data store 122, segment information data store 124 and segment cue point alert module 114 may be located at media content provider 250. These components may recognize content segments in an input media stream provided by encoder 202 and may add cue points to the input media stream. In one embodiment, segment prefetcher 116 and replacement segment data store 126 are located at media player 260. In one embodiment, action module 206 asks segment cue point alert module 114 if there are any upcoming cue points in the current stream. In response, segment cue point alert module 114 may provide an indication of the upcoming cue points. Action module 206 may detect a cue point and perform an action with respect to a certain segment (e.g., segment replacement using segment prefetcher 116 and replacement segment data store 126). In another embodiment, some other distribution of the components of the media stream cue point creator may be used.

Figures 3A, 3B:
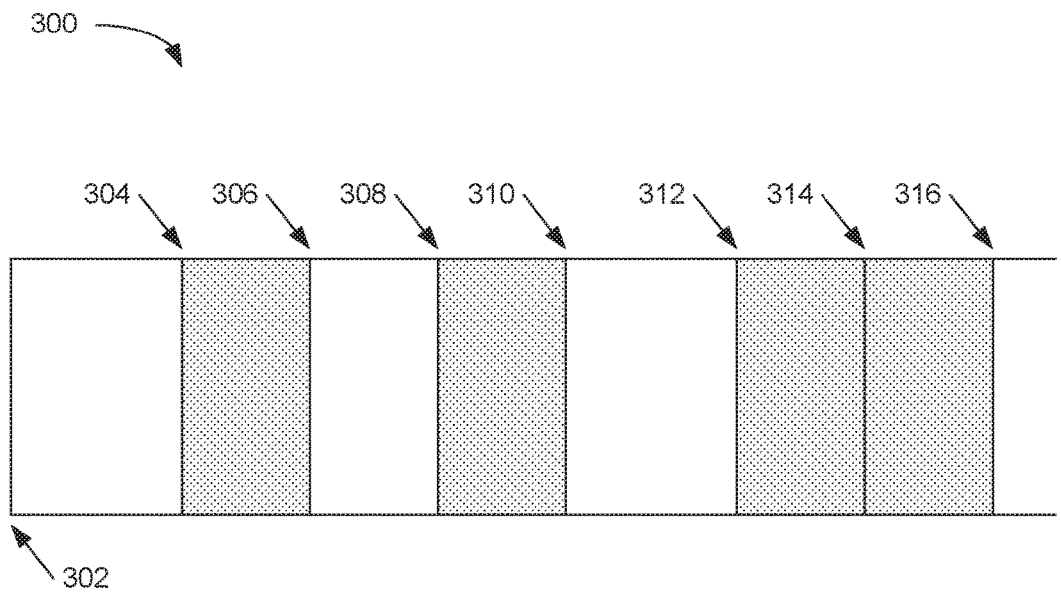
FIG. 3a is a diagram illustrating a segmented media stream, according to an embodiment.
FIG. 3b is a diagram illustrating a segment information data store, according to an embodiment.

FIG. 3a is a diagram illustrating a media stream 300, according to an embodiment. The media stream 300 may be, for example, an audio stream, a video stream, a combination audio and video stream, or some other type of media stream. According to the processes described herein, segment identifier module 112 may identify particular content segments of the media stream 300. In one embodiment, the media stream 300, or stored media file, may begin at time 302 and have regular content segments between times 302-304, 306-308, and 310-312. Segment identifier module 112 may identify advertisement segments between times 304-306, 308-310, 312-314, and 314-316. In other embodiments, the identified segments may have some other lengths or be some other segment types. In other embodiments, some other unit of measurement, besides time, may be used to designate the start and end points of the various segments in media stream 300.

FIG. 3b is a diagram illustrating a segment information data store 124, according to an embodiment. In one embodiment, upon identifying one or more segments in media stream 300 that match known segments in segment reference data store 122, segment identifier module 112 creates cue points associated with the identified segments. In one embodiment, segment identifier module 112 creates corresponding entries in segment information data store 124. In one embodiment, the cue point entries may include an identifier of the media stream 300 from which the segment was identified, an identifier of the segment itself 01, 02, 03, 04, a start time/value of the segment 304, 308, 312, 314 within the media stream, a stop time/value of the segment 306, 310, 314, 316, and other information or metadata associated with the segment, such as an indication of what product the advertisement is for, the subject matter of the advertisement, a recommended audience for the advertisement, an object found to be present, the name of a specific person, etc. In one embodiment, segment identifier module 112 may create an entry with a start time/value for the segment and then update the entry later with a stop time/value. In other embodiments, the cue point information may be stored in segment information data store 124 in some other format and each entry may have additional, fewer or different fields.

Figure 4:
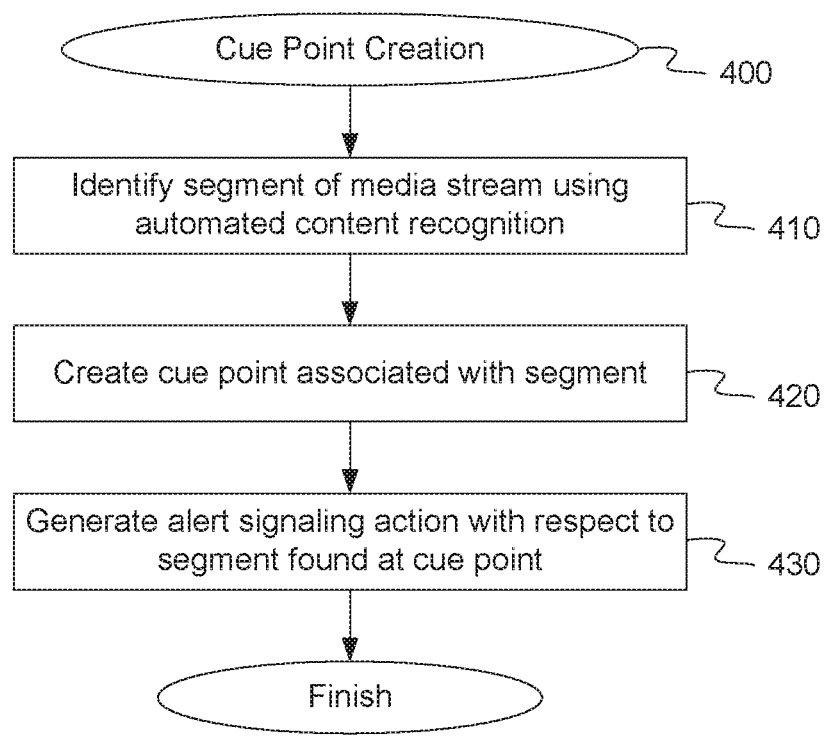
FIG. 4 is a flow diagram illustrating a cue point creation method, according to an embodiment.

FIG. 4 is a flow diagram illustrating a cue point creation method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to identify segments in a media stream, generate corresponding cue points and facilitate the performance of various segment operations using the generated cue points. In one embodiment, method 400 may be performed by media stream cue point creator 110, as shown in FIGS. 1a-2b. In another embodiment, method 400 may be performed by segment identifier 112, segment cue point alert module 114 and action module 206, as shown in FIG. 2c.

Referring to FIG. 4, at block 410, method 400 identifies a segment of a media stream or file using automated content recognition. In one embodiment, segment identifier module uses fingerprinting technology and the audio and/or video perceptual characteristics of the stream identify particular segments in the stream. In one embodiment, a segment may include a series of frames in the stream that have the same perceptual characteristics as a known segment in segment reference data store 122. Additional details of the segment identification process can be found in U.S. Pat. No. 5,918,223 issued Jun. 29, 1999, U.S. Pat. No. 6,834,308 issued Dec. 21, 2004, U.S. Pat. No. 8,031,947 issued Oct. 4, 2011, and U.S. Pat. No. 8,112,818 issued Feb. 7, 2012, the contents of each of which are hereby incorporated by reference herein. In another embodiment, segment identifier 112 uses object recognition and classification technology to identify objects found within the video images of the media stream. Additional details of segment identification are also described below with respect to FIG. 5.

At block 420, method 400 creates a cue point associated with the segment identified at block 410. In one embodiment, upon identifying a segment that matches a known segment in segment reference data store 122, segment identifier module 112 creates a cue point associated with the identified segment. In one embodiment, segment identifier module 112 creates a corresponding entry in segment information data store 124. In one embodiment, the cue point entry may include an identifier of the media stream from which the segment was identified, an identifier of the segment itself, a start time/value of the segment within the media stream, a stop time/value of the segment, and other information or metadata associated with the identification made of the segment.

At block 430, method 400 generates an alert to signal replacement of the segment found at the cue point created at block 420, or some other operation. In one embodiment, segment cue point alert module 114 generates an alert signaling replacement of a segment in the media stream identified by the cue point entry in segment information data store 124. Segment cue point alert module 114 identifies a cue point in the media stream. This may occur during playback of the media stream by DVR playback controller 106 or prior to playback when the stream is stored as a filed in media data store 104. In one embodiment, segment cue point alert module 114 receives an indication of playback from DVR playback controller 106 and compares the location to the cue points in segment information data store 124. When a cue point is reached, segment cue point alert module 114 may trigger an operation, such as segment replacement. Additional details of segment replacement are described below with respect to FIG. 6.

Figure 5:
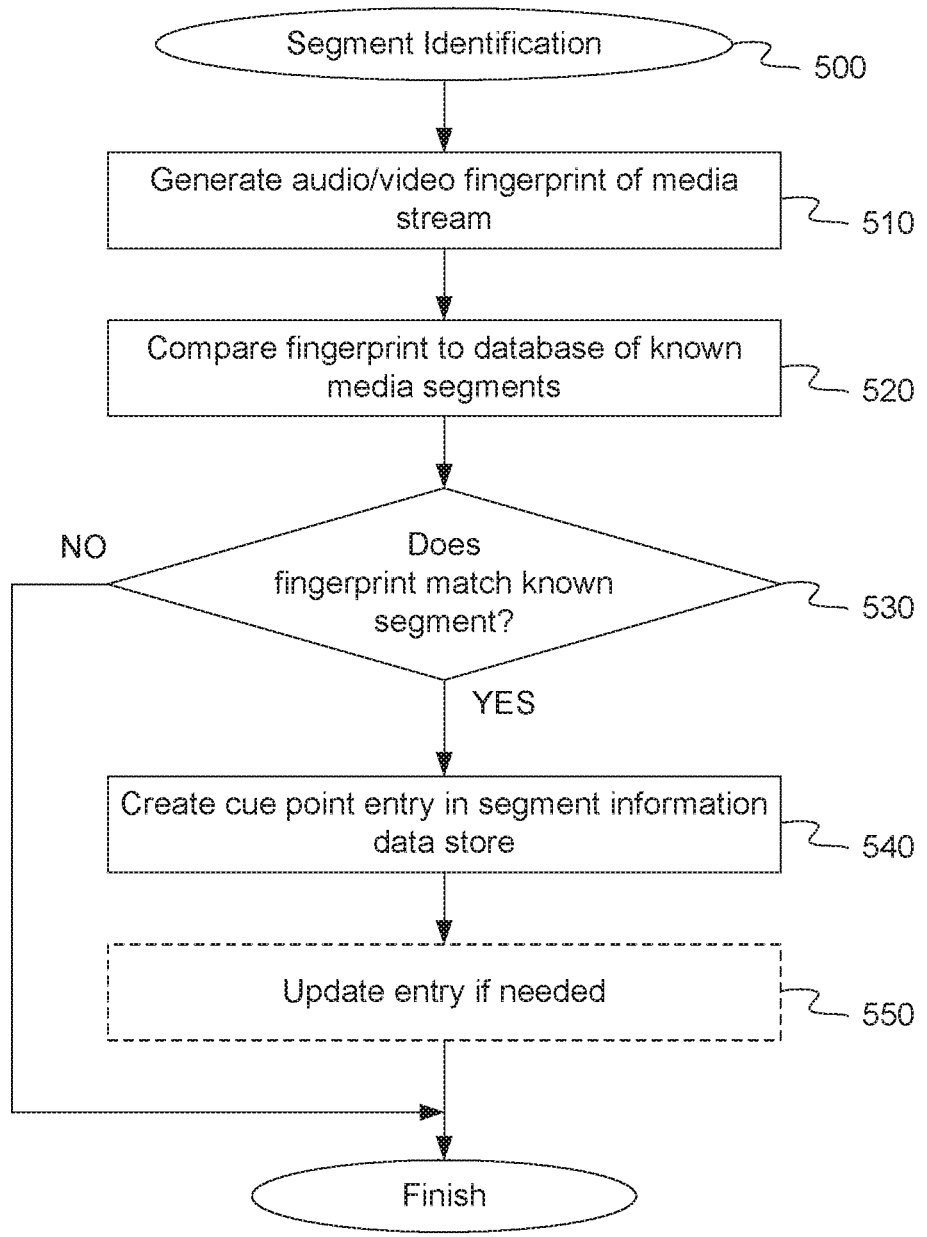
FIG. 5 is a flow diagram illustrating a segment identification method, according to an embodiment.

FIG. 5 is a flow diagram illustrating a segment identification method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to identify content segments in a media stream on which various operations may be performed. In one embodiment, method 500 may be performed by media stream cue point creator 110, as shown in FIGS. 1a-2b. In another embodiment, method 500 may be performed by segment identifier 112, segment cue point alert module 114 and action module 206, as shown in FIG. 2c.

Referring to FIG. 5, at block 510, method 500 generates a fingerprint of the media stream. In one embodiment, segment identifier module 112 identifies segments of a media stream stored in media data store 104 using automated content recognition. Segment identifier module 112 generates an audio and/or video fingerprint of at least a portion of the media stream. For example, segment identifier module 112 may divide a stored audio stream into frames and extract acoustic or perceptual features of each frame. Segment identifier module 112 may generate an n-dimensional feature vector for each frame for later comparison. For example, segment identifier 112 may extract features from a frame of video, or a group of frames of video. Segment identifier 112 may generate an n-dimensional feature vector for each frame or group of frames.

At block 520, method 500 compares the fingerprint to a database of known media segments, objects, and classes of objects. In one embodiment, segment identifier module 112 compares the feature vector to stored feature vectors corresponding to known segments from segment reference data store 122. Segment reference data store 122 may store feature vectors, fingerprints, complete copies, or other representations of known segments of media content or objects. For example, segment reference data store 122 may include indication of known advertisements which could be identified and removed from the media streams in media data store 104. For example, segment reference data store 122 may include indication of certain types of objects, and even specific objects. Segment reference data store 122 may be populated with information obtained directly from advertisers, other content creators, or a content distributor, or with information obtained from monitoring previous media streams, or with models and classifiers of objects.

At block 530, method 500 determines whether the fingerprint matches a known segment or object. In one embodiment, a segment may match if the feature vectors are within an acceptable threshold, thereby indicating that the segment from the stream and the known segment have the same or similar perceptual characteristics. In another embodiment, a segment may match if the computed characteristics match closely to a model or classifier for a particular object or class of objects.

If the fingerprint matches, at block 540, method 500 creates a cue point entry in segment information data store 124. In one embodiment, segment identifier module 112 creates an entry associated with the identified segment in segment information data store 124. In one embodiment, the cue point entry may include an identifier of the media stream from which the segment was identified, an identifier of the segment itself, a start time/value of the segment within the media stream, a stop time/value of the segment, and other information or metadata associated with the identified segment, as shown in FIG. 3b. At block 550, method 500 optionally updates the cue point entry created at block 540. For example, in a live data stream segment identifier module 112 may create an entry with a start time/value for the segment and then update the entry later with a stop time/value, once the stop time/value is known. In another embodiment, there may be separate entries for start time/value and the stop time/value.

Figure 6:
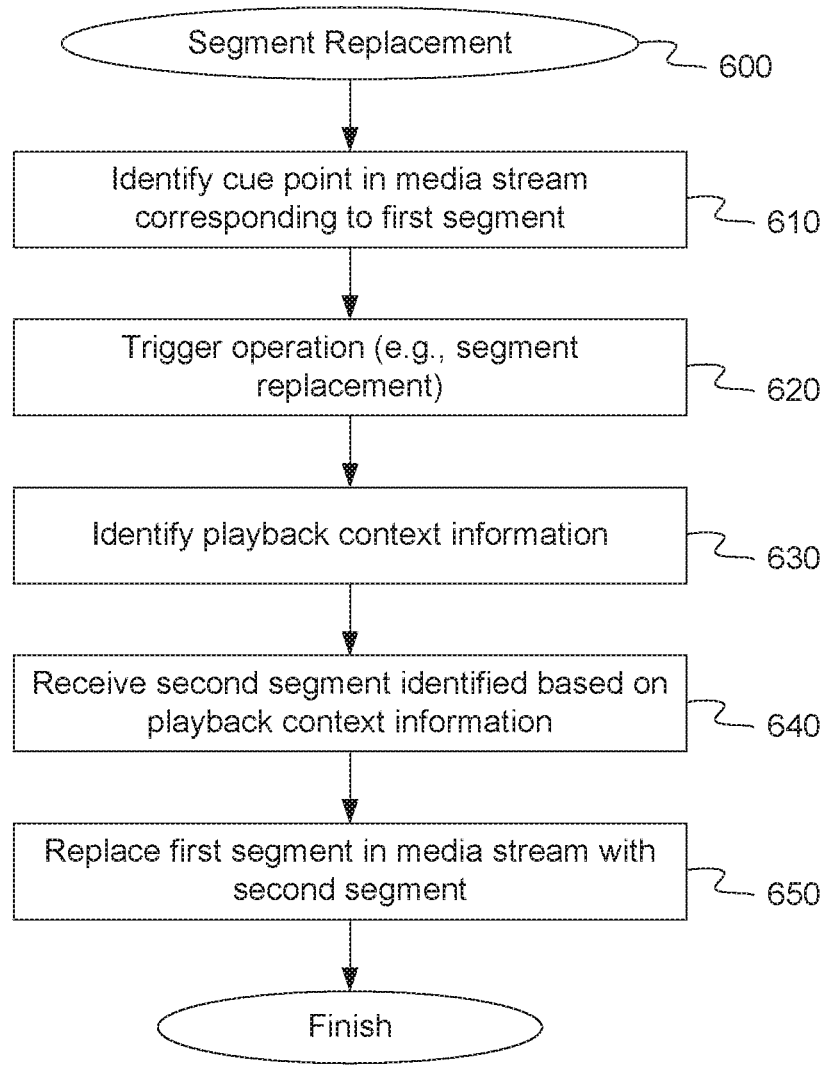
FIG. 6 is a flow diagram illustrating a segment replacement method, according to embodiment.

FIG. 6 is a flow diagram illustrating a segment replacement method, according to embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to replace an identified segment in a media stream with a new or different segment. In one embodiment, method 600 may be performed by media stream cue point creator 110, as shown in FIGS. 1a-2b. In another embodiment, method 600 may be performed by segment identifier 112, segment cue point alert module 114 and action module 206, as shown in FIG. 2c.

Referring to FIG. 6, at block 610, method 600 identifies a cue point in the media stream. In one embodiment, segment cue point alert module 114 identifies a cue point in the media stream. This may occur during playback of the media stream by DVR playback controller 106 or prior to playback when the stream is stored as a file in media data store 104. In one embodiment, segment cue point alert module 114 receives an indication of playback from DVR playback controller 106 and compares the location to the cue points in segment information data store 124. When a cue point is reached, at block 620, segment cue point alert module 114 may trigger an operation, such as segment replacement, display of an overlay, etc. In one embodiment, segment cue point alert module 114 generates an alert signaling replacement of, or other action with respect to, the segment in the media stream identified by the cue point entry in segment information data store 124.

At block 630, method 600 identifies playback context information for the media stream. The playback context information may include, for example, a time when playback occurs, a location where playback occurs, an indication of who requested playback, or other information. Using the playback context information, segment cue point module 114 may request a new segment from replacement segment data store 126, or determine what other appropriate action to take.

At block 640, method 600 receives a second segment identified based on the playback information. In one embodiment, segment pre-fetch module 116 may request and receive content segments (e.g., advertisements) from an external source, such as media replacement server 160. Segment pre-fetch module 116 may populate replacement segment data store 126 with the received replacement segments. In one embodiment, segment pre-fetch module 116 may request segments based on the playback context information and media replacement server 160 may determine the appropriate segments to provide. In another embodiment, segment pre-fetch module 116 may request generic segments from media replacement server 160 and segment cue point alert module 114 may make a selection of segments from replacement segment data store 126 based on the playback context information.

At block 650, method 600 replaces the original first segment in the media stream with the new second segment. In one embodiment, segment cue point alert module 114 provides an instruction to DVR playback controller 106 to replace the original segment in the playing media stream with the replacement segment from replacement segment data store 126. In one embodiment, replacement of the segment may include modifying the media stream such that the old segment is removed and the new segment is inserted. In another embodiment, replacement may refer to halting playback of the media stream, playing the replacement segment, and then resuming playback of the original media stream. In another embodiment, rather than replacing a segment, segment cue point alert module 114 may provide an instruction to DVR playback controller 106 to block a certain segment, remove a certain segment, insert an overlay of complementary information, insert a clickable banner advertisement, or to perform some other operation. In another embodiment, segment cue point alert module 114 may provide an instruction to another device (e.g. a computer tablet, mobile phone, laptop, game console, lighting controller, set top box, robot actuator) to perform some other operation.

Figure 7:
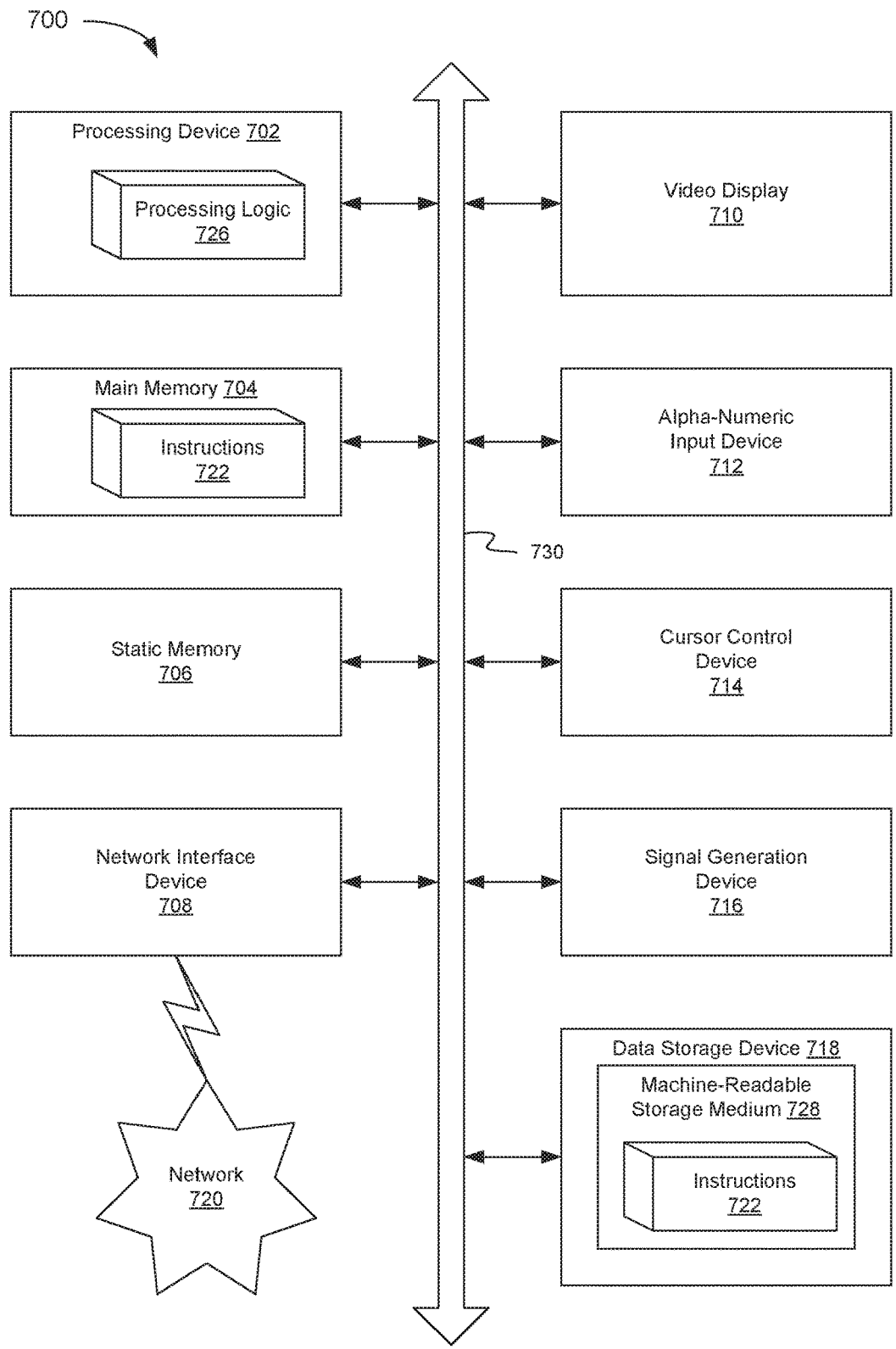
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent media player 100 of FIG. 1a, server 150 of FIG. 1b or media distribution point 200 of FIG. 2a.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the notification manager 210 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of media stream cue point creator 110 or 210) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a media stream comprising at least one of an audio portion or a video portion, wherein the media stream lacks an indicator of at least one content segment of a plurality of content segments within the media stream;
   identifying, by a processing device, a first content segment of the plurality of content segments of the media stream, wherein the first content segment corresponds to a known segment in a segment reference data store;
   creating a first cue point entry in a segment information data store, wherein the first cue point entry is associated with the first content segment, and wherein the first cue point entry in the segment information data store comprises an identifier of the media stream, an identifier of the first content segment, a value indicating a start time of the first content segment, and a value indicating an end time of the first content segment;
   comparing at least a portion of the plurality of content segments to one or more cue point entries in the segment information data store;
   determining that the first content segment corresponds to the first cue point entry in the segment information data store; and
   performing an operation on the first segment of the media stream identified by the first cue point entry.

2. The method of claim 1, further comprising:
   generating an alert signaling the operation to be performed on the first content segment in the media stream.

3. The method of claim 2, wherein the operation is performed during playback of the media stream.

4. The method of claim 2, wherein the operation comprises replacing the first content segment in the media stream with a second content segment.

5. The method of claim 4, further comprising:
   identifying playback context information for playback of the media stream; and
   identifying the second content segment in view of the playback context information.

6. The method of claim 5, wherein the playback context information comprises at least one of a time when playback of the media stream is requested, a location where playback of the media stream is requested, or an indication of a requestor of playback of the media stream.

7. The method of claim 1, wherein identifying the first content segment of the plurality of content segments of the media stream comprises:
   generating a fingerprint of at least a portion of the first content segment;
   comparing the fingerprint to a plurality of known segments in the segment reference data store; and
   determining whether the fingerprint matches at least one of the plurality of known segments.

8. A system comprising:
   a memory comprising a media data store; and
   a processing device operatively coupled to the memory, the processing device to:
   receive a media stream comprising at least one of an audio portion or a video portion, wherein the media stream lacks an indicator of at least one content segment of a plurality of content segments within the media stream;
   identify a first content segment of the plurality of content segments of the media stream, wherein the first content segment corresponds to a known segment in a segment reference data store;
   create a first cue point entry in a segment information data store, wherein the first cue point entry is associated with the first content segment, wherein the first cue point entry in the segment information data store comprises an identifier of the media stream, an identifier of the first content segment, a value indicating a start time of the first content segment, and a value indicating an end time of the first content segment;
   compare at least a portion of the plurality of content segments to one or more cue point entries in the segment information data store;
   determine that the first content segment corresponds to the first cue point entry in the segment information data store; and
   perform an operation on the first content segment of the media stream identified by the first cue point entry.

9. The system of claim 8, wherein the processing device is further to:
   generate an alert signaling the operation to be performed on the first content segment in the media stream.

10. The system of claim 9, wherein the operation is performed during playback of the media stream.

11. The system of claim 9, wherein the operation comprises replacing the first content segment in the media stream with a second content segment.

12. The system of claim 11, wherein the processing device is further to:
- identify playback context information for playback of the media stream; and
- identify the second content segment in view of the playback context information.

13. The system of claim 12, wherein the playback context information comprises at least one of a time when playback of the media stream is requested, a location where playback of the media stream is requested, or an indication of a requestor of playback of the media stream.

14. The system of claim 8, wherein to identify the first content segment of the plurality of content segments of the media stream, the processing device is further to:
- generate a fingerprint of at least a portion of the first content segment;
- compare the fingerprint to a plurality of known segments in the segment reference data store; and
- determine whether the fingerprint matches at least one of the plurality of known segments.

15. A non-transitory computer-readable storage medium storing instructions which, when executed by a processing device, cause the processing device:
- receive a media stream comprising at least one of an audio portion or a video portion, wherein the media stream lacks an indicator of at least one content segment of a plurality of content segments within the media stream;
- identify, by the processing device, a first content segment of the plurality of content segments of the media stream, wherein the first content segment corresponds to a known segment in a segment reference data store;
- create a first cue point entry in a segment information data store, wherein the first cue point entry is associated with the first content segment, and wherein the first cue point entry in the segment information data store comprises an identifier of the media stream, an identifier of the first content segment, a value indicating a start time of the first content segment, and a value indicating an end time of the first content segment;
- compare at least a portion of the plurality of content segments to one or more cue point entries in the segment information data store;
- determine that the first content segment corresponds to the first cue point entry in the segment information data store; and
- perform an operation on the first content segment of the media stream identified by the first cue point entry.

16. The non-transitory computer-readable storage medium of claim 15, wherein the processing device further to:
- generate an alert signaling the operation to be performed on the first content segment in the media stream, wherein the operation is performed during playback of the media stream.

17. The non-transitory computer-readable storage medium of claim 16, wherein the operation is performed by a first device that is different from a second device that created the cue point and is performed in response to an instruction received from the second device.

18. The non-transitory computer-readable storage medium of claim 17, wherein the processing device further to:
- identify playback context information for playback of the media stream; and
- identify a second content segment in view of the playback context information, wherein the operation comprises replacing the first content segment in the media stream with the second content segment.

19. The non-transitory computer-readable storage medium of claim 18, wherein the playback context information comprises at least one of a time when playback of the media stream is requested, a location where playback of the media stream is requested, or an indication of a requestor of playback of the media stream.

20. The non-transitory computer-readable storage medium of claim 15, wherein to identify the first content segment of the plurality of content segments of the media stream, the processing device to:
- generate a fingerprint of at least a portion of the first segment;
- compare the fingerprint to a plurality of known segments in the segment reference data store; and
- determine whether the fingerprint matches at least one of the plurality of known segments.

* * * * *